(12) United States Patent
Boyce

(10) Patent No.: US 8,825,693 B2
(45) Date of Patent: Sep. 2, 2014

(54) CONDITIONAL STRING SEARCH

(75) Inventor: Kevin Gerard Boyce, Chelsea (CA)

(73) Assignee: Trend Micro Incorporated, Tokyo (JP)

( * ) Notice: Subject to any disclaimer, the term of this patent is extended or adjusted under 35 U.S.C. 154(b) by 1763 days.

(21) Appl. No.: 11/955,369

(22) Filed: Dec. 12, 2007

(65) Prior Publication Data
US 2009/0157673 A1  Jun. 18, 2009

(51) Int. Cl.
*G06F 17/30* (2006.01)
*G06F 17/27* (2006.01)

(52) U.S. Cl.
CPC ........ *G06F 17/2765* (2013.01); *G06F 17/3985* (2013.01)
USPC ............ 707/765; 707/756; 707/773; 707/780

(58) Field of Classification Search
CPC ................................................ G06F 17/30985
USPC .......... 707/1, 2, 3, 6, 7, 100, 104.1, 765, 756, 707/736, 773, 775, 780
See application file for complete search history.

(56) References Cited

U.S. PATENT DOCUMENTS

| | | | |
|---|---|---|---|
| 7,254,632 B2* | 8/2007 | Zeira et al. ..................... | 709/224 |
| 7,325,013 B2* | 1/2008 | Caruso ................. | 1/1 |
| 7,406,470 B2* | 7/2008 | Mathur et al. ........ | 1/1 |
| 7,508,985 B2* | 3/2009 | Van Lunteren ............... | 382/181 |
| 7,529,746 B2* | 5/2009 | Ichiriu et al. ........................ | 1/1 |

\* cited by examiner

*Primary Examiner* — Fred I Ehichioya
*Assistant Examiner* — Dangelino Gortayo
(74) *Attorney, Agent, or Firm* — IP-Mex Inc.; Victoria Donnelly

(57) ABSTRACT

A method and a system for efficient search of string patterns characterized by positional relationships in a character stream are disclosed. The method is based on grouping string patterns of a dictionary into at least two string sets and performing string search processes of a text of the character stream based on individual string sets with the outcome of a search process influencing a subsequent search process. A system implementing the method comprises a dictionary processor for generating string sets with corresponding text actions and search actions, a conditional search engine for locating string patterns belonging to at least one string set in a text according to a current search state, a text operator for producing an output text according to search results, and a search operator for determining a subsequent search state.

20 Claims, 14 Drawing Sheets

| 240(A) → | Pattern | Text Action | Search Action | |
|---|---|---|---|---|
| | | | Search Parameters | Next state |
| $\sigma_1$ 712(1) | •• 720 | 722 | 724 | 726 |
| $\sigma_2$ 712(2) | •• 720 | 722 | | |
| $\sigma_3$ 712(3) | •• 720 | | | |
| $\sigma_4$ 712(4) | •• 720 | | 724 | 726 |

*FIG. 7*

| 240(B) → | Pattern | Text Action | Search Action | |
|---|---|---|---|---|
| | | | Search Parameters | Next state |
| $\sigma^*_1$ 812(1) | ·· 720 | 722 | 824 | 826 |
| $\sigma^*_2$ 812(2) | ·· | | | |
| $\sigma^*_3$ 812(3) | ·· | | | |
| $\sigma^*_4$ 812(4) | ·· | | | |

*FIG. 8*

| State-Transition Matrix 1000 | | State(0) | State(1) | State(2) | State(3) | State(4) |
|---|---|---|---|---|---|---|
| | | | | To | | |
| From | State(0) | × | Φ(0,1) | Φ(0,2) | Φ(0,3) | Φ(0,4) |
| | State(1) | Φ(1,0) | × | Φ(1,2) | Φ(1,3) | Φ(1,4) |
| | State(2) | Φ(2,0) | Φ(2,1) | × | Φ(2,3) | Φ(2,4) |
| | State(3) | Φ(3,0) | Φ(3,1) | Φ(3,2) | × | Φ(3,4) |
| | State(4) | Φ(4,0) | Φ(4,1) | Φ(4,2) | Φ(4,3) | × |

*FIG. 10*

| State | State Parameters | Search Action |
|---|---|---|
| 1 | $L$, $0 \leq L < \Lambda$, | Skip next L characters, |
|   | $\sigma_1$, $0 \leq \sigma_1 < \Sigma$ | Start pattern search using String Set $\sigma_1$ |
| 2 | $L$, $0 \leq L < \Lambda$, | Mark present position $\pi_1$ in text. Skip next L characters, |
|   | $\sigma_1$, $0 \leq \sigma_1 < \Sigma$, | Start pattern search using String Set $\sigma_1$. |
|   | $\sigma_2$, $0 \leq \sigma_2 < \Sigma$ | If a pattern from String Set $\sigma_1$ is found, mark position $\pi_2$ in text, and search for a pattern of String Set $\sigma2$ in text domain $\{\pi1, \pi2\}$ |
| 3 | $\sigma_1$, $0 \leq \sigma_1 < \Sigma$, | Mark present position $\pi_1$ in text. |
|   | $\sigma_2$, $0 \leq \sigma_2 < \Sigma$ | Start pattern search using String Set $\sigma_1$. |
|   |   | If a pattern of String Set $\sigma_1$ is found, mark position $\pi_2$ in text, and search for a pattern in String Set $\sigma2$ in domain $\{\pi1, \pi2\}$. Reset to state(0) |
| 4 | $\sigma_1$, $0 \leq \sigma_1 < \Sigma$, | Find two consecutive patterns of String Set $\sigma_1$ in text. |
|   | $\sigma_2$, $0 \leq \sigma_2 < \Sigma$, | Find two consecutive patterns of Dictionary-segment $\sigma2$ in |
|   | $\sigma_3$, $0 \leq \sigma_3 < \Sigma$ | Search domain |

*FIG. 11*

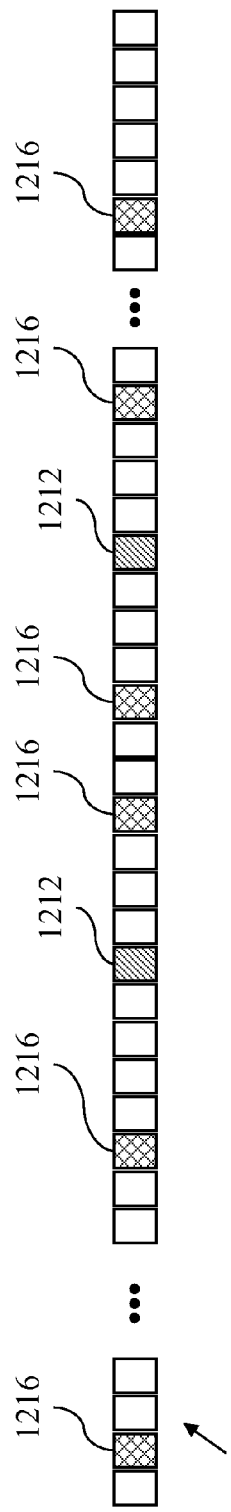
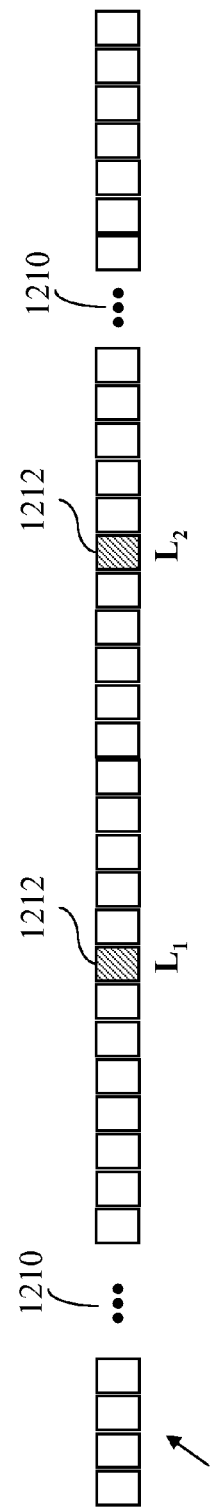
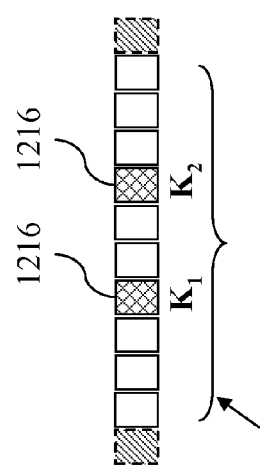
FIG. 12

CONDITIONAL STRING SEARCH

FIELD OF THE INVENTION

The present invention relates to detection of strings in a data stream. In particular, the invention is directed to a method and a system for fast string search in a data stream characterized by positional correlation among strings.

BACKGROUND

String search in a text or a stream of characters is a field of growing importance in applications such as knowledge acquisition and deep packet inspection. A deep-packet inspection system examines a text of characters or a continuous stream of characters to detect the presence of specific string patterns belonging to a predefined list of string patterns. As occurrence of string patterns in character streams grows, the search effort increases resulting in reducing the throughput of the system in terms of the number of characters that can be examined per unit time.

The list of string patterns may include simple strings, complex strings, or a mixture of simple strings and complex strings. Fast search techniques for simple strings are well known in the art. In particular a search method known as the Aho-Corasick method is determined to be computationally efficient but is limited to simple strings. A computationally-efficient method for detecting and locating occurrence in a data file or a data stream of complex strings is disclosed in U.S. patent application Ser. No. 11,678,587 (Boyce), the specification of which is incorporated herein by reference. In some applications, a pattern may be of interest only if it bears some logical or positional relationship to other patterns in the same list of string patterns. For example, specific strings patterns found anywhere in a phrase may be relevant only if the phrase is preceded and/or succeeded by certain punctuation marks. The absence of such punctuation marks in a part of a text under consideration may render the search for the specific string patterns unnecessary.

There is a need, therefore, to explore string-search methods and apparatus which take into account relevance of combinations of string patterns in a text according to known interrelationships among the string patterns and, advantageously explore potential search-effort reduction that may result from such interrelationships.

SUMMARY

In according with one aspect, the present invention provides a method of string search in a character stream. The method comprises steps of: grouping string patterns of a dictionary of string patterns into a plurality of string sets according to predetermined criteria; defining a set of parameterized search states; and associating with each string pattern of each string set a search action prescribing a search domain and a subsequent search state. Each search state is characterized by (1) domain parameters defining a search domain within the character stream, (2) a string set from among the plurality of string sets, and (3) a search rule.

To examine an input text extracted from the character stream, an initial search state is selected, according to a predefined criterion, as a current search state and the search domain is initially set to be the entire input text. A current string set and a corresponding current rule are determined according to the preset characterization of the search states. A search procedure based on the current rule is executed to determine a location of a string pattern belonging to the current string set within the current search domain. If a string pattern is found, a new search state and new domain parameters corresponding to the found string pattern may be determined. The search process is repeated with the new search state used as a current search state and the new domain parameters delimiting the search domain. A text action, selected from a set of predefined text actions, is associated with each string pattern of each string set. A text action may specify marking, altering, substituting, or deletion of a string pattern found in the input text.

A search rule may be encoded as a set of data-driven instructions. The dictionary may include a mixture of simple strings and complex strings. A search data structure may be used under any search state or may be specifically tailored to individual search states. The plurality of string sets may comprise non-intersecting string sets and composite string sets. A composite string set may comprise two or more non-intersecting string sets.

In accordance with another aspect, the present invention provides a method of string search in a character stream. The method comprises steps of: constructing a dictionary of string patterns which associates a text action, selected from among a set of text actions, with each string pattern; and grouping the string patterns into a predefined number of ordered string sets according to predetermined criteria.

To locate a string pattern in an input text taken from the character stream, a first string set is selected as a current string set and the entire input text is used as a current search domain. A search procedure is executed to determine current positions of string patterns belonging to the current string set within the current search domain. The current positions of the located string patterns in the input text together with corresponding text actions are cumulatively stored in a buffer. The current positions are used to define a second search domain and a subsequent string set is selected according to a predetermined order of the string sets.

The search procedure is repeated to locate search strings belonging to the second string set within the second domain. If the number of ordered string sets exceeds two, the search procedure is repeated until all the string sets are considered or until no string patterns are found in a search domain.

Excluding the initial search domain, a search domain may be defined as a portion of the input text between two consecutive positions of string patterns located in an immediately preceding search domain. Alternatively, a search domain may be defined as a portion of the input text within a predefined number of characters following one of the positions of string patterns located in an immediately preceding search domain.

In accordance with a further aspect, the present invention provides a system for string search in a character stream. The system comprises: (1) a dictionary processor; (2) a conditional search engine; (3) a search operator; and (4) a text operator.

The dictionary processor categorizes string patterns of a dictionary into a plurality of string sets and associates with each string pattern of each string set search information for use upon detecting a string pattern. The search information includes: a text action, selected from a predefined set of text actions, to be applied to the character stream; a subsequent string set; and domain parameters defining a search domain within the character stream. The dictionary processor may further assign to each string set a search rule encoded as a set of data-driven instructions. The dictionary processor may also assign to each string set a respective search data structure.

The conditional search engine locates current string patterns belonging to a current string set within a current search domain in the character stream. The search operator determines a subsequent string set and corresponding search domain according to located string patterns. The text operator performs text actions corresponding to the located string patterns.

BRIEF DESCRIPTION OF THE DRAWINGS

Embodiments of the present invention will be further described with reference to the accompanying exemplary drawings, in which:

FIG. 7 illustrates a dictionary of string patterns partitioned into four string sets, with a text-action associated with each string pattern and a search action associated with each string set, in accordance with an embodiment of the present invention;

FIG. 8 illustrates a dictionary of string patterns partitioned into four string sets, with a text-action and a search action associated with each string pattern in accordance with an embodiment of the present invention;

FIG. 10 illustrates a state-transition matrix identifying a search function corresponding to a transition from any search state to any other search state in the system of FIG. 2 in accordance with an embodiment of the present invention;

FIG. 11 illustrates exemplary search functions, defined in the state-transition vector of FIG. 9B or the state-transition matrix of FIG. 10, and associated with search states of the system of FIG. 2 in accordance with an embodiment of the present invention;

FIG. 12 illustrates a two stage search process in accordance with an embodiment of the present invention;

TERMINOLOGY

Simple string: A simple string comprises a sequence of characters.

Complex string: A complex string comprises at least two words, of which at least one word is an ambiguous word in which each character is an indefinite character defined only according to a class association.

Simple dictionary: A simple dictionary may be devised to include a set of simple strings of special interest. The simple dictionary may expand or shrink as the need arises.

Complex dictionary: A complex dictionary comprises a set of complex strings.

Text: A text is a sequence of characters extracted from a data stream and may include ordinary characters and indefinite characters.

String Length The length of a string is the number of characters of the string, including indefinite characters.

Search domain: A portion of a text within which string-search process is performed.

String location or string position: A string pattern has an arbitrary number of characters. The location (or position) of a string pattern in a text (or a search domain within the text) is an index (memory address) of either a first character or a last character of the string pattern. Either the first character or the last character of a string pattern may be used as the location (position) indicator of the string pattern, as long as it is used consistently throughout the string-search system.

String set: A subset of string patterns of a dictionary of string patterns is referenced as a string set.

Search state: A search states defines a search domain and conditions under which a string-search process is performed.

Post-detection action: Post-detection action is an action to be performed after detecting a string pattern in a search domain. Post-detection action is performed according to post-detection information.

DETAILED DESCRIPTION

Figure 1:
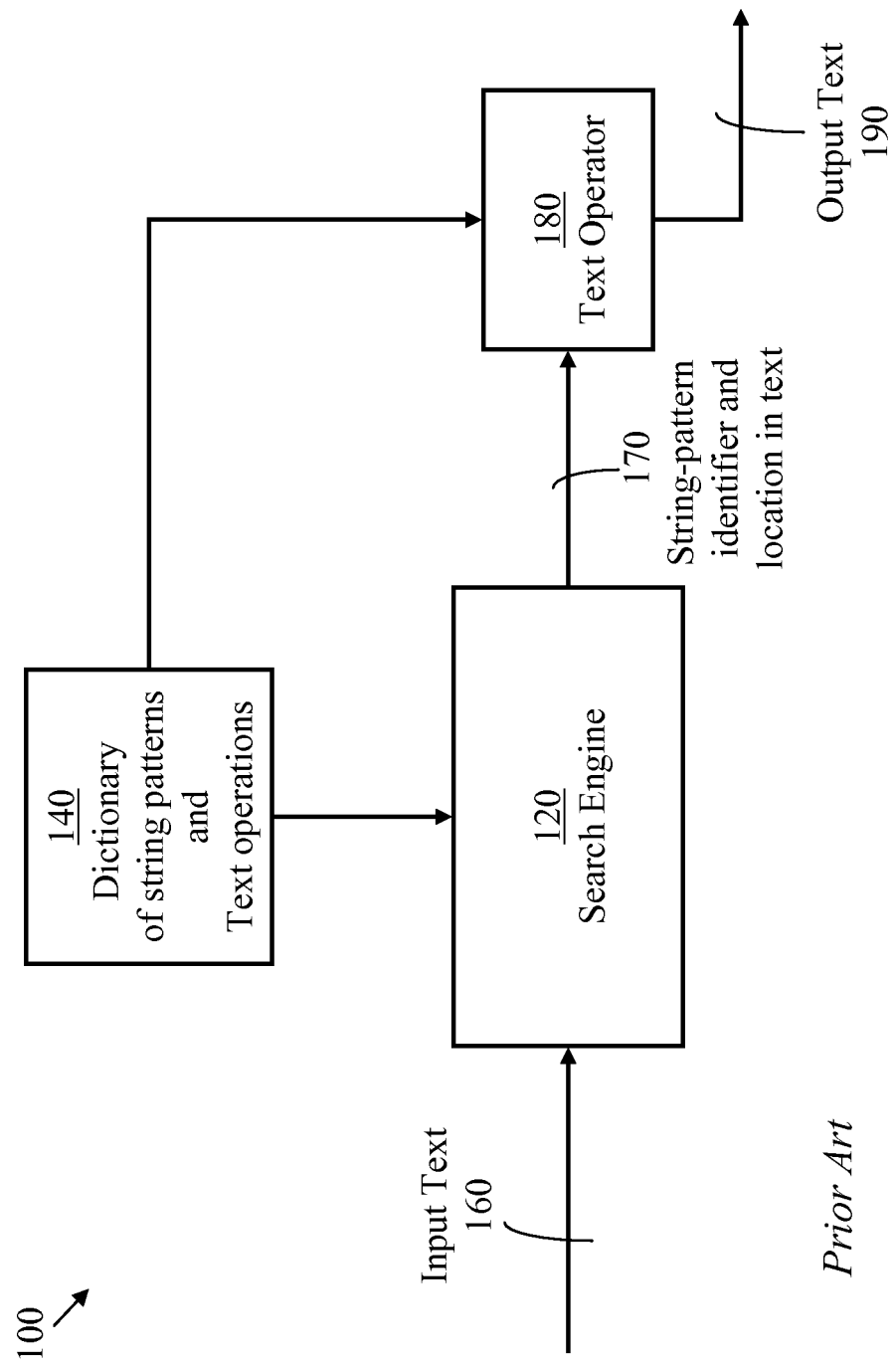
FIG. 1 illustrates a prior-art system for locating string patterns in a file or a data stream.

FIG. 1 illustrates a prior-art system 100 for locating occurrence, in a character stream, of strings belonging to a predefined dictionary 140 of string patterns of interest. A search engine 120 executes a search process for detecting and locating any of the string patterns of the dictionary in an input text 160 extracted from the character stream. A text operator 180 may perform text actions on the text, such as deletion of a string from the text, and produces an output text 190. The text action may be based on a predefined policy, or may be individually specified for each string pattern. A buffer, not illustrated, is typically provided to hold a text until processing is complete.

Figure 2:
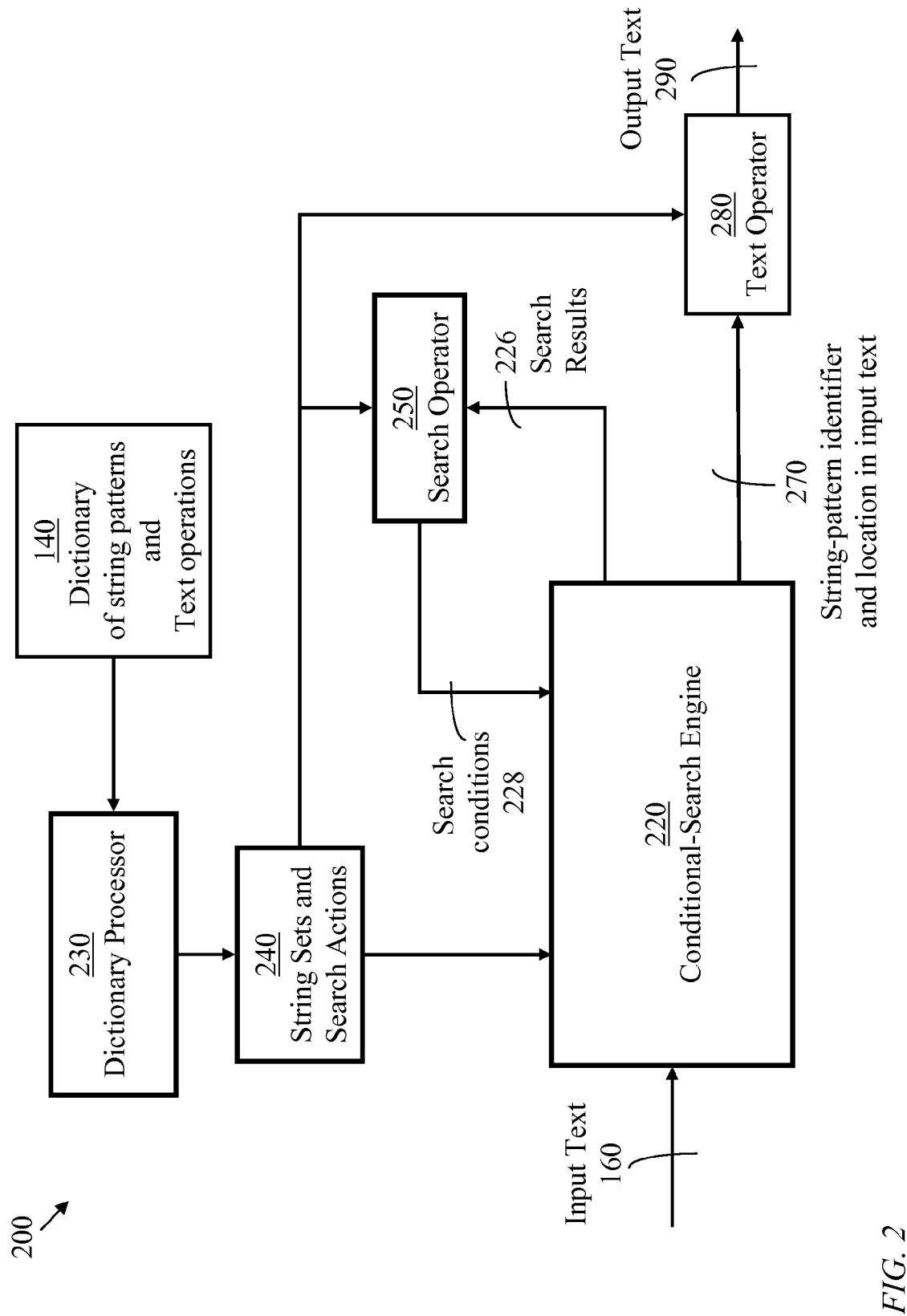
FIG. 2 illustrates a system for locating string patterns in a file or a data stream while observing interrelationships among string patterns, the system being additionally adapted to reduce processing effort, in accordance with an embodiment of the present invention.

FIG. 2 illustrates a system 200 for efficient examination of a character stream, or a text extracted from the character stream, to determine and locate presence of string patterns of predefined dictionary 140, subject to constraints of consequential relationships among string patterns. The string patterns may be simple patterns, complex patterns, or combinations of simple and complex patterns. A dictionary processor 230 sorts the string patterns and groups them into string categories according to known interrelationships among the string categories. For example, the string categories may be characterized by positional relationships, where a string pattern of a first category should precede a string pattern of a second category in a text in order to be of any significance to the search process. The first category may, for example, comprise verbs and the second category may comprise nouns. The string patterns of each category comprise a string set. The resulting string sets are held in a storage medium 240 which may comprise individual memory devices, each holding a string set, or a shared memory device with each string set occupying a logical partition of the memory device.

Dictionary processor 230 also produces a state-transition vector or a state-transition matrix, for use in the conditional-search process, to be described with reference to FIG. 9B and FIG. 10.

A conditional-search engine 220, hereinafter referenced as "engine 220", determines occurrence of any of string patterns of the dictionary 240 in a text under consideration. A text operator 280 may modify the text before release to a subsequent processing stage. Rather than searching the entire text for string patterns of the entire dictionary 140, conditional-search engine 220 initially searches the text using only one of the string sets determined to be a "root set of string patterns". A root set is selected by a system administrator or determined by some topological sorting techniques not described herein.

A search operator 250 analyzes results 226 of the initial search process based on the root set of string patterns and determines if further search is needed. If a subsequent search is needed, the search operator 250 sets search conditions 228 which include specifying a string set, or a superset of string sets, to be used in a subsequent search, and setting a search domain for the subsequent search. The process may be repeated for further searches with the search conditions for each search stage influenced by results of a preceding search. Notably, while the search domain for the initial search process is the entire text, the search domain for a subsequent search process may be limited to a portion of the text.

Engine 220 operates under a predefined number of search states. According to one embodiment, a search state may be associated with a string set, a search method, a search domain, rules governing the search process, and a subsequent search state.

Figure 3:
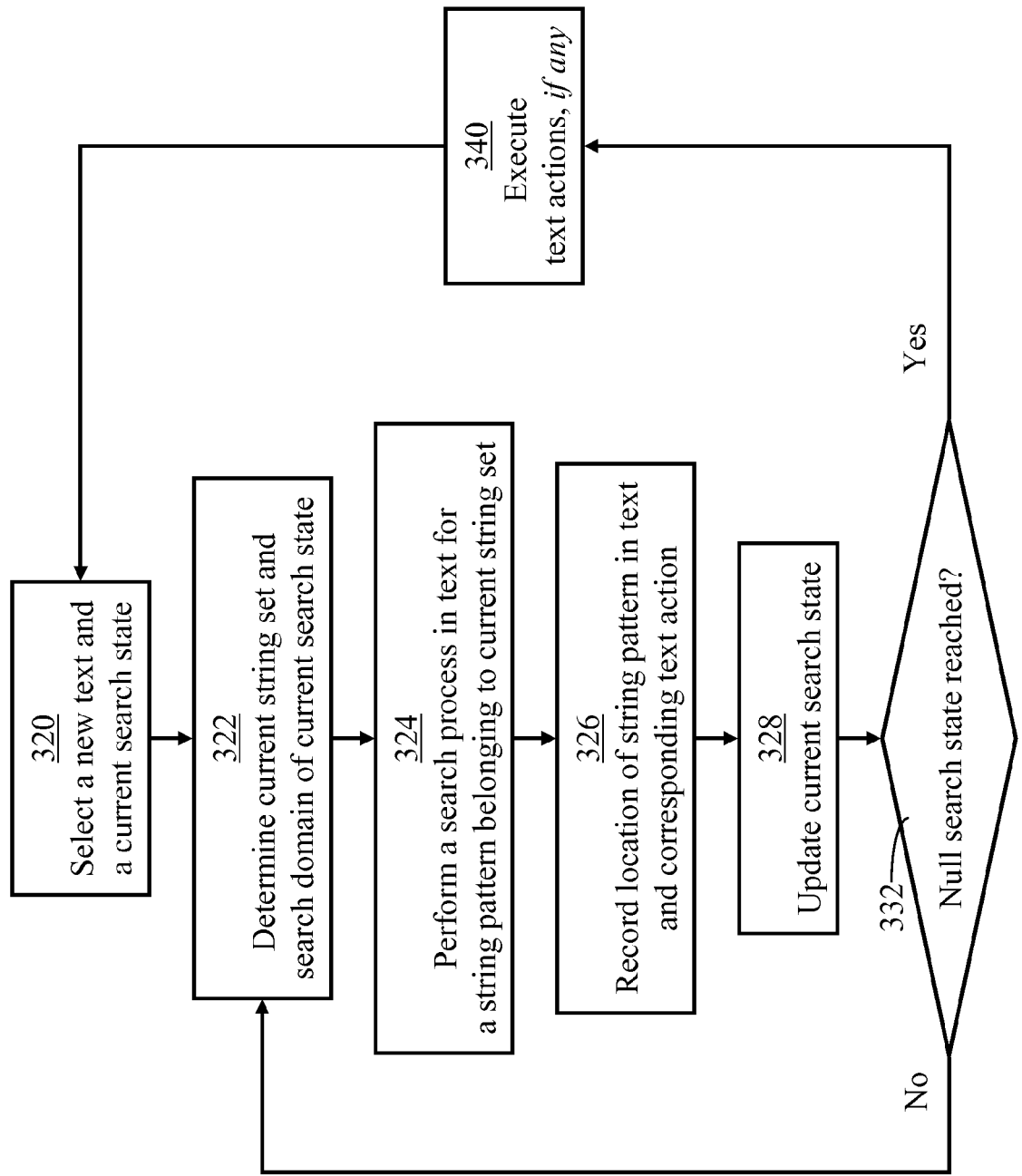
FIG. 3 is a flow chart illustrating a generic string-search method used in the system of FIG. 2, in accordance with an embodiment of the present invention.

FIG. 3 illustrates one mode of operation of engine 220 in accordance with an embodiment of the invention. Engine 220 receives a new input text 160, extracted from a character stream selected from a plurality of character streams, and selects an initial search state as a current search state (step 320). The initial search state is preferably associated with a root set of string patterns, stored in storage medium 240.

In step 322, engine 220 selects a string set to be used under the current search state and determines a corresponding search domain. In the first activation of step 322, the search domain may be the entire input text 160. In step 324, engine 220 performs a search process using a specified search method, such as the Aho-Corasick method if the string set is known to contain exclusively simple strings, or the method of U.S. application Ser. No. 11,678,587 if the string set includes complex strings. If a string pattern belonging to the current string set is found, both the location of the found string pattern in the input text 160 and the corresponding text action are recorded (step 326). In step 328, a subsequent search state is determined either according to the current string set or a located string pattern. A subsequent search state may be a 'NULL state', indicating completion of processing a current text.

If the subsequent search state determined in step 332 is a valid search state, steps 322, 324, 326, and 328 are executed again under a new search state. Otherwise, if the subsequent search state determined in step 328 is a NULL state, and if string patterns in the cyclic execution of steps 322, 324, 326, are detected, text actions associated with the detected string patterns are executed (step 340) and a new text may be selected (step 320).

Figure 4:
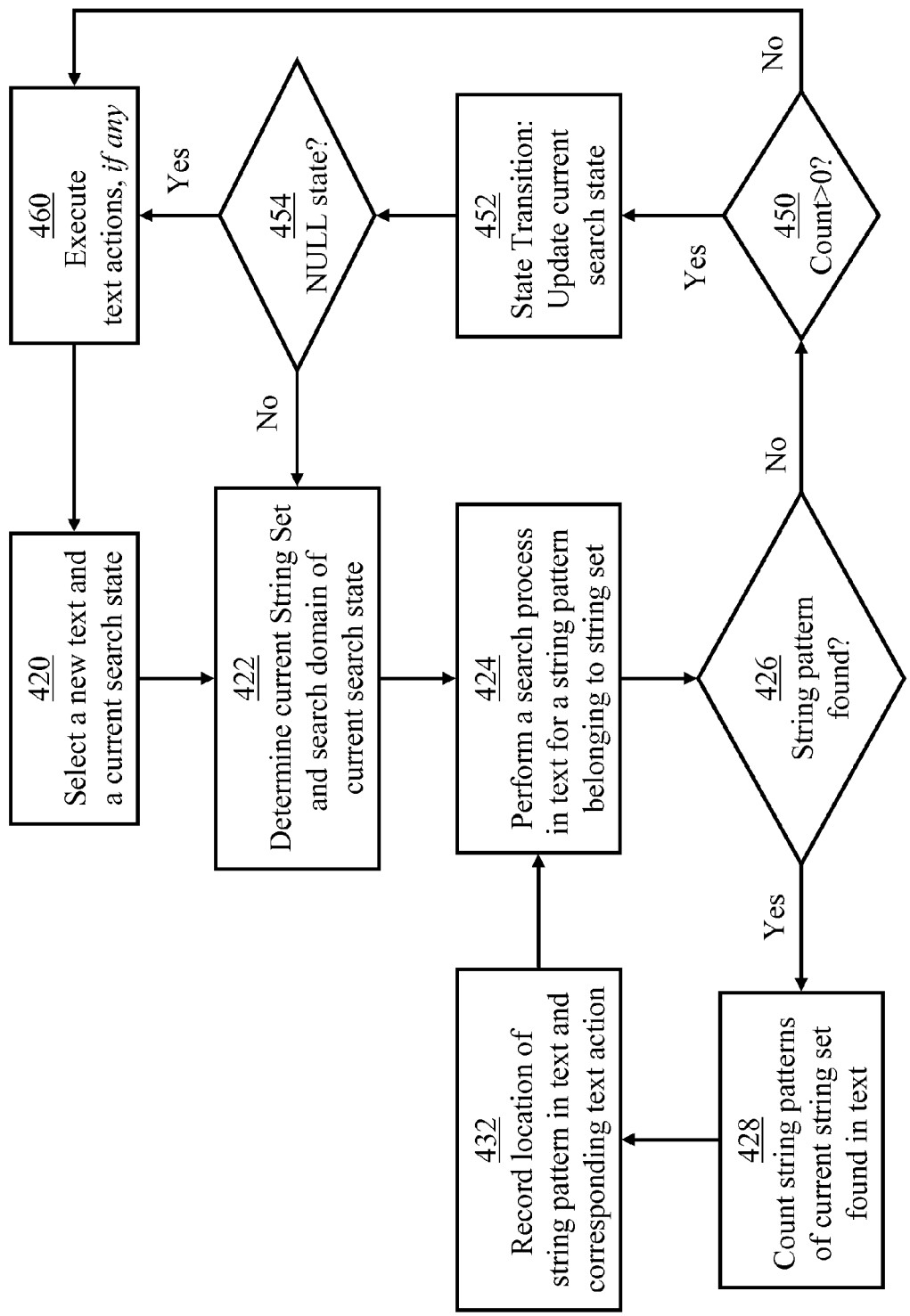
FIG. 4 is a flow chart illustrating a specific string-search method used in the system of FIG. 2, in accordance with an embodiment of the present invention.

FIG. 4 illustrates an alternative mode of operation of engine 220 in accordance with an embodiment of the present invention. In step 420, engine 220 receives a new input text 160, selects an initial search state to serve as a current search state. In step 422, engine 220 selects a string set to be used under the current search state and determines a corresponding search domain. In step 424, engine 220 performs a search process using a specified search technique. If a string pattern belonging to the current string set is found (step 426), a counter of the number of found string patterns under the current search state is increased (step 428) and both the location of the found string pattern in the input text 160 and the corresponding text action are recorded (step 432). Step 424 is activated again and the cycle of steps 424, 426, 428, and 432 are repeated until step 426 determines that no further string patterns belonging to the current string set are present in the input text 160. If the input text 160 does not contain any string patterns belonging to the current string set, step 450 directs the search process to step 460.

If the input text 160 contains at least one string pattern belonging to the current string set, step 450 directs the search process to step 452 which my update the current search state according to a predefined rule or according to search-action data associated with string sets or individual string patterns as will be described with reference to FIG. 7 and FIG. 8. Step 452 may determine a number of search-state transitions corresponding to each new text processed and if the number exceeds a predefined limit, step 452 may set the updated current search state to be a NULL state. Alternatively, the search-action data may be structured to lead to a NULL state to indicate completion of processing of a new text.

If the updated current search state is a valid search state, indicating that the search process is not yet complete, step 454 directs the search process to step 422 which selects a current string set, and a search domain corresponding to the updated current string state. The cycle of steps 424, 426, 428, and 432 is repeated until step 426 determines that no further strings belonging to the (new) current string set are present in the input text 160.

If the number of strings found in the current state is zero, step 450 directs the search process to step 460. At this point, engine 220 may have detected a number of string patterns under the previous search state but none under the current search state. Accordingly, step 460 performs the recorded text actions of the detected string patterns and the search process returns to step 420 to process another input text.

If at least one string is found in the current state, step 450 directs the search process to step 452. At this point, engine 220 has detected string patterns under both the previous search state and the current search state. If step 454 determines that a subsequent search state is a NULL state, step 454 directs the search process to step 460 which performs the recorded text actions of the detected string patterns under two search states and the search process returns to step 420 to process another input text.

If step 454 determines that the subsequent search state received from step 452 is a valid search state, step 422 is revisited to detect further string patterns in the input text 160, and so on.

Figure 5:
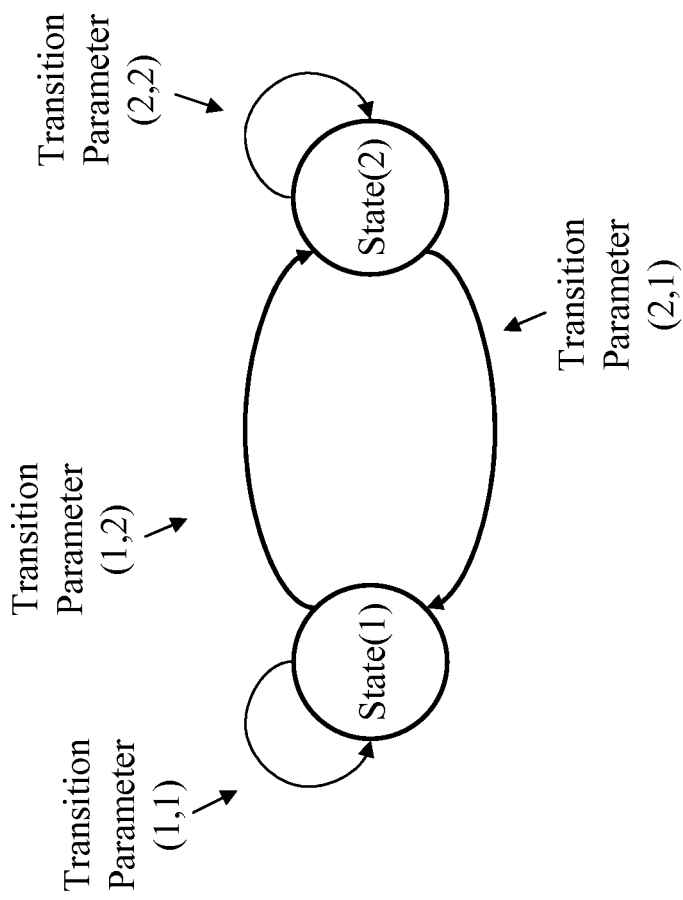
FIG. 5 illustrates two search-states associated with the system of FIG. 2, in accordance with an embodiment of the present invention.

FIG. 5 illustrates transitions between two search states, labeled State(1) and State(2). A transition may take place after a string pattern is detected in a text under consideration. Detection of a string pattern may not result in state change. A transition from State(1) to State(2) may take place after the entire text has been examined under the search conditions of State(1), and a transition from State(2) back to State(1) may take place when a new text is processed.

Alternatively, a transition from State(1) to State(2) may take place after two consecutive string patterns are detected under State(1). A transition from State(2) back to State(1)

may then take place after performing a search under State(2) over a search domain defined by the two consecutive string patterns.

Figure 6:
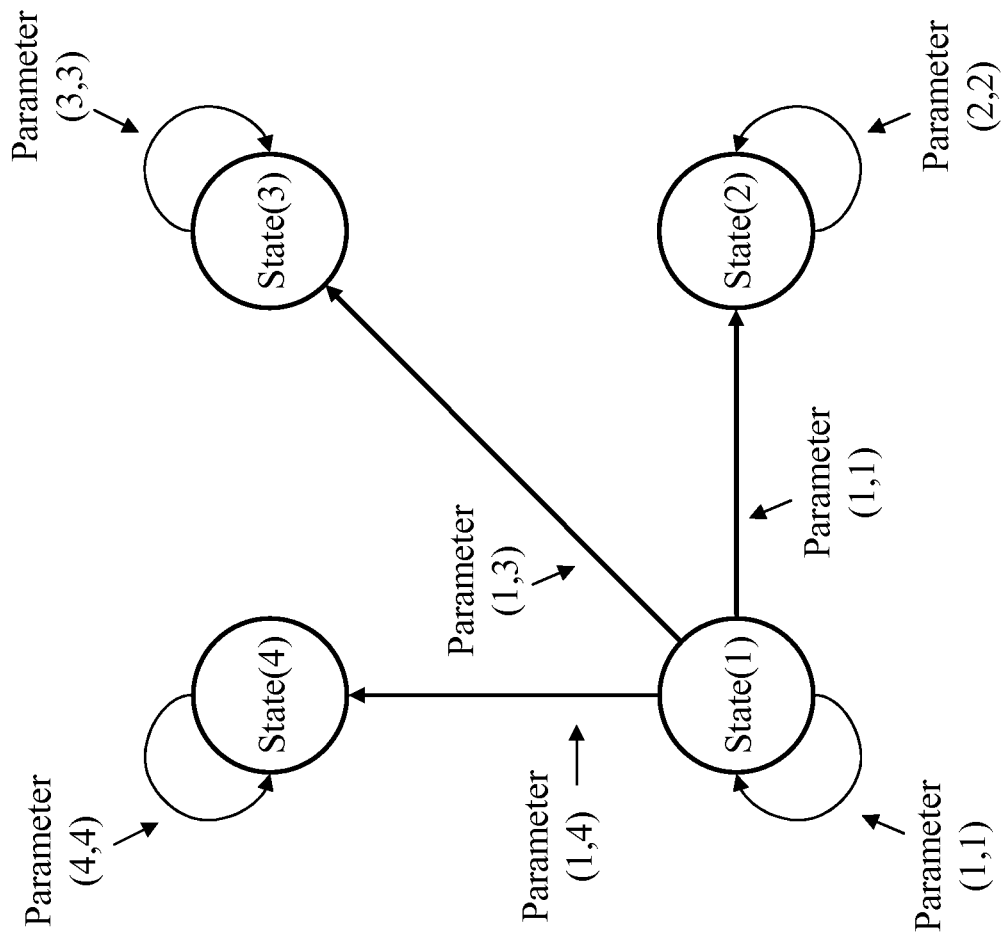
FIG. 6 illustrates transitions from a search state to any other search state of a set of search states associated with the system of FIG. 2, in accordance with an embodiment of the present invention.

FIG. 6 illustrates four search states labeled State(1), State(2), State(3), and State(4). Transition from one state to one of the other three states is determined according to search actions associated with individual string patterns as determined by dictionary processor 230 and stored in storage medium 240. FIG. 6 illustrates potential transitions from State(1). In general, mutual transitions among all search states may be permitted.

FIG. 7 illustrates content of storage medium 240(A), including string sets 712 and search actions generated by dictionary processor 230. The original dictionary 140 is sorted into four string sets 712, individually identified as 712(1), 712(2), 712(3), and 712(4), and further labeled as string sets $\sigma_1$, $\sigma_2$, $\sigma_3$, and $\sigma_4$, respectively. Each string set comprises a respective number of string patterns 720 and corresponding text actions 722. A text action may be marking, altering, substitution, or deletion of a string pattern. Each string set 712 may be specified by a search state; in the example of FIG. 7, there is a one-to-one correspondence between the four search states of FIG. 6 and the string sets of FIG. 7. However, in general, engine 220 may define more search states than string sets, and a string set 712(j), $1 \leq j \leq 4$ may be specified by more than one search state. Additionally, a search state may specify more than one string set as will be described with reference to FIG. 9A.

A search state may specify, in addition to string set, or a combination of string sets, search actions including search parameters 724 and subsequent search states 726. The search parameters may include a search domain, a search method to be used, rules for transition to other search states, and a set of functional steps implemented as software-based instructions. FIG. 7 illustrates a case where all string patterns 720 of a string set 712 have the same search parameters 724 and subsequent search state 726.

FIG. 8 illustrates string sets 812, stored in a storage medium 240(B), similar to string sets 712 of FIG. 7, individually identified as 812(1), 812(2), 812(3), and 812(4), and further labeled as string sets $\sigma^*_1$, $\sigma^*_2$, $\sigma^*_3$, and $\sigma^*_4$, respectively. The string patterns 720 in FIG. 8 may be individually assigned search parameters 824 and subsequent search states 826.

Figures 9A, 9B:
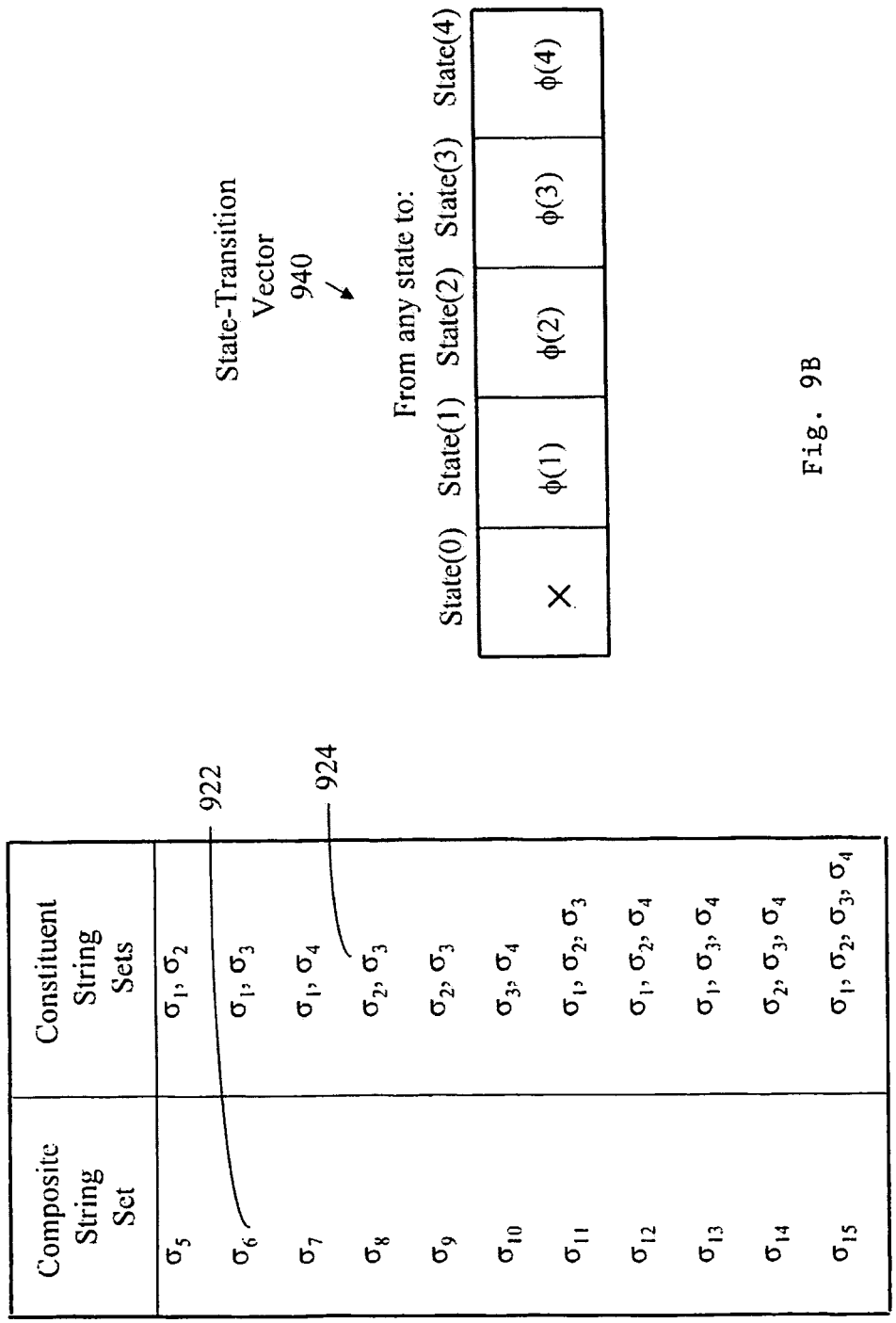
FIG. 9A illustrates composite string sets, each comprising at least two string sets, for use in an embodiment of the present invention.
FIG. 9B illustrates a state-transition vector identifying a search function associated with each search state, in accordance with an embodiment of the present invention.

FIG. 9A illustrates composite string sets 922, labeled as $\sigma_5$ to $\sigma_{15}$, each comprising at least two string sets from among four non-intersecting string sets 924, labeled $\sigma_1$, $\sigma_2$, $\sigma_3$, and $\sigma_4$. In some applications, it may be desirable to perform string search within a superset of string sets (a composite string set).

FIG. 9B illustrates a state-transition vector 940 identifying search function $\phi(1)$, $\phi(2)$, $\phi(3)$, and $\phi(4)$, respectively associated with four search states labeled as State(1), State(2), State(3), and State(4). A search state labeled State(0), may be reserved for search termination or for some other function. The state-transition vector 940 may be used in conjunction with the search parameters 724 of FIG. 7.

FIG. 10 illustrates a state-transition matrix 1000 identifying a search function $\Phi(j,k)$, $0 \leq j < 5$, $0 \leq k < 5$, corresponding to a transition from any search state to any other search state, in a system defining five search states labeled State(0) to State(5). A search function $\Phi(j,k)$ may be used in conjunction with the search parameters 824 of FIG. 8

FIG. 11 illustrates exemplary search functions $\phi(j)$ defined in the state-transition vector of FIG. 9B or $\Phi(j,k)$, the state-transition matrix of FIG. 10.

FIG. 12 illustrates a text comprising string patterns 1212 belonging to a first string set $\sigma_1$ and string patterns 1216 belonging to a second string set $\sigma_2$. A search procedure using string sets $\sigma_1$ and $\sigma_2$ may be used to detect all the string patterns 1212 and 1216. However, if a text action corresponding to a string pattern 1216 is applicable only under certain positional relationship to a string pattern 1212, further steps need be taken to avoid improper text actions.

Applying the method of FIG. 4, the text is examined using the first string set $\sigma_1$ containing string patterns 1212 to detect string patterns 1212 at locations L1 and L2. The search domain defined for the second string set $\sigma_2$ is determined to be a portion of the text between two string patterns 1212. The portion of the text between L1 and L2 is therefore examined to detect string patterns 1216 at locations K1 and K2; L1<K1<K2<L2. Thus, corresponding text actions are applied at locations L1, K1, K2, and L2.

It is noted that string patterns 1212 and 1216 are of arbitrary lengths, even though the length distinction is not illustrated in FIG. 12. Likewise, the length distinction is not illustrated for the string patterns of FIG. 13 and FIG. 14.

Figure 13:
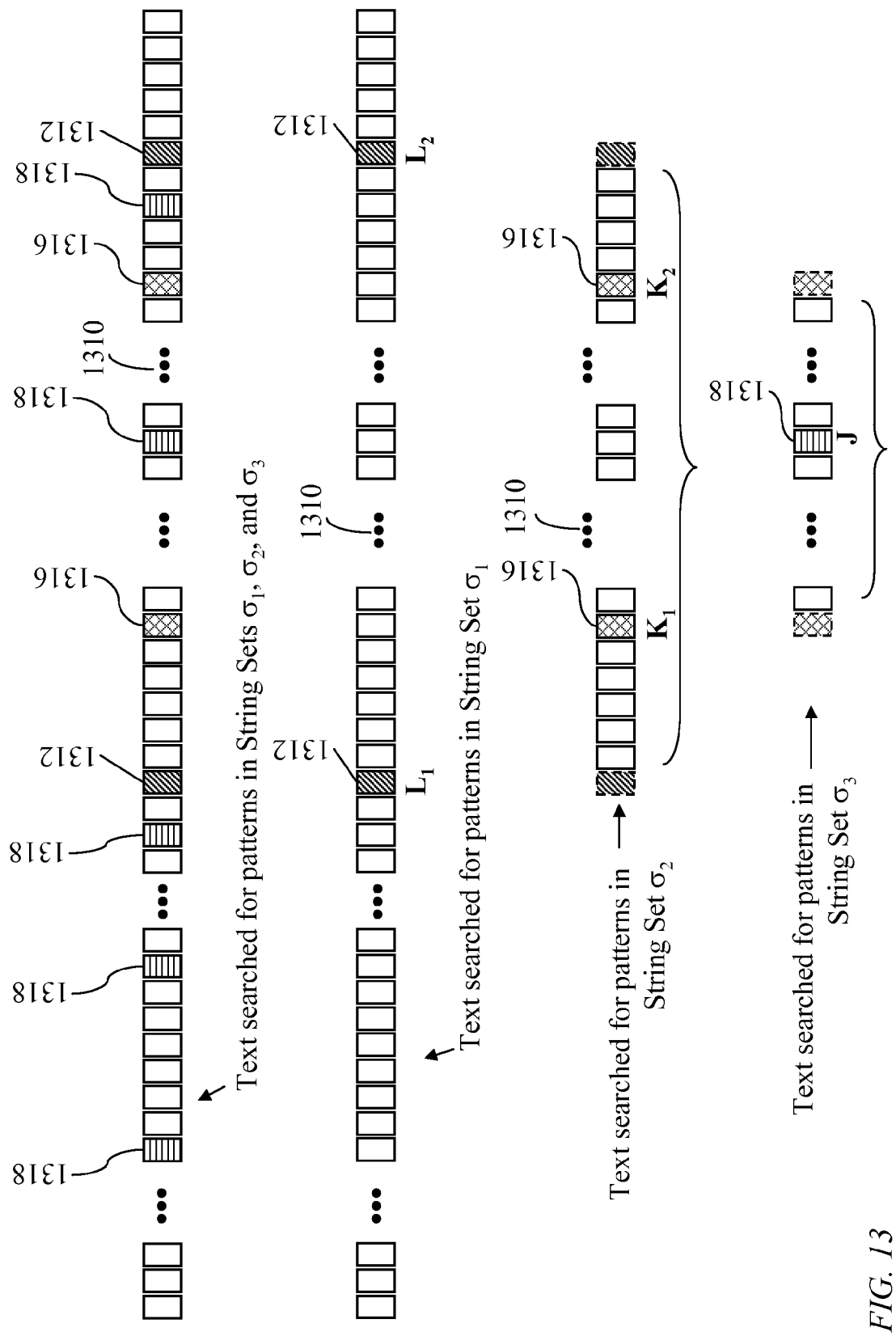
FIG. 13 illustrates a three stage search process in accordance with an embodiment of the present invention.

FIG. 13 illustrates a text comprising string patterns 1312 belonging to a first string set $\sigma_1$, string patterns 1316 belonging to a second string set $\sigma_2$, and string patterns belonging to a third string set $\sigma_3$. A search procedure using string sets $\sigma_1$, $\sigma_2$, and $\sigma_3$ may be used to detect all the string patterns 1312, 1316, and 1318. However, if a text action corresponding to a string pattern 1318 is applicable only under certain positional relationship to string patterns 1312 and 1316, text actions may be improperly taken.

Applying the method of FIG. 4, the text is examined using the first string set $\sigma_1$ containing string patterns 1312 to detect string patterns 1312 at locations L1 and L2. The search domain defined for the second string set $\sigma_2$ is determined to be a portion of the text between two string patterns 1312. The portion of the text between L1 and L2 is therefore examined to detect string patterns 1316 at locations K1 and K2. Likewise, the portion of the text between K1 and K2 is examined to detect one string pattern 1318 at location J; L1<K1<J<K2<L2. Thus, corresponding text actions are applied only at locations L1, K1, J, K2, and L2.

It is noted that the simplified examples of FIG. 12 and FIG. 13 indicate a modest reduction in the number of text actions taken. In operation, however, the proportion of string patterns which belong to the dictionary 140 but are exempt from text actions can be significant.

Figure 14:
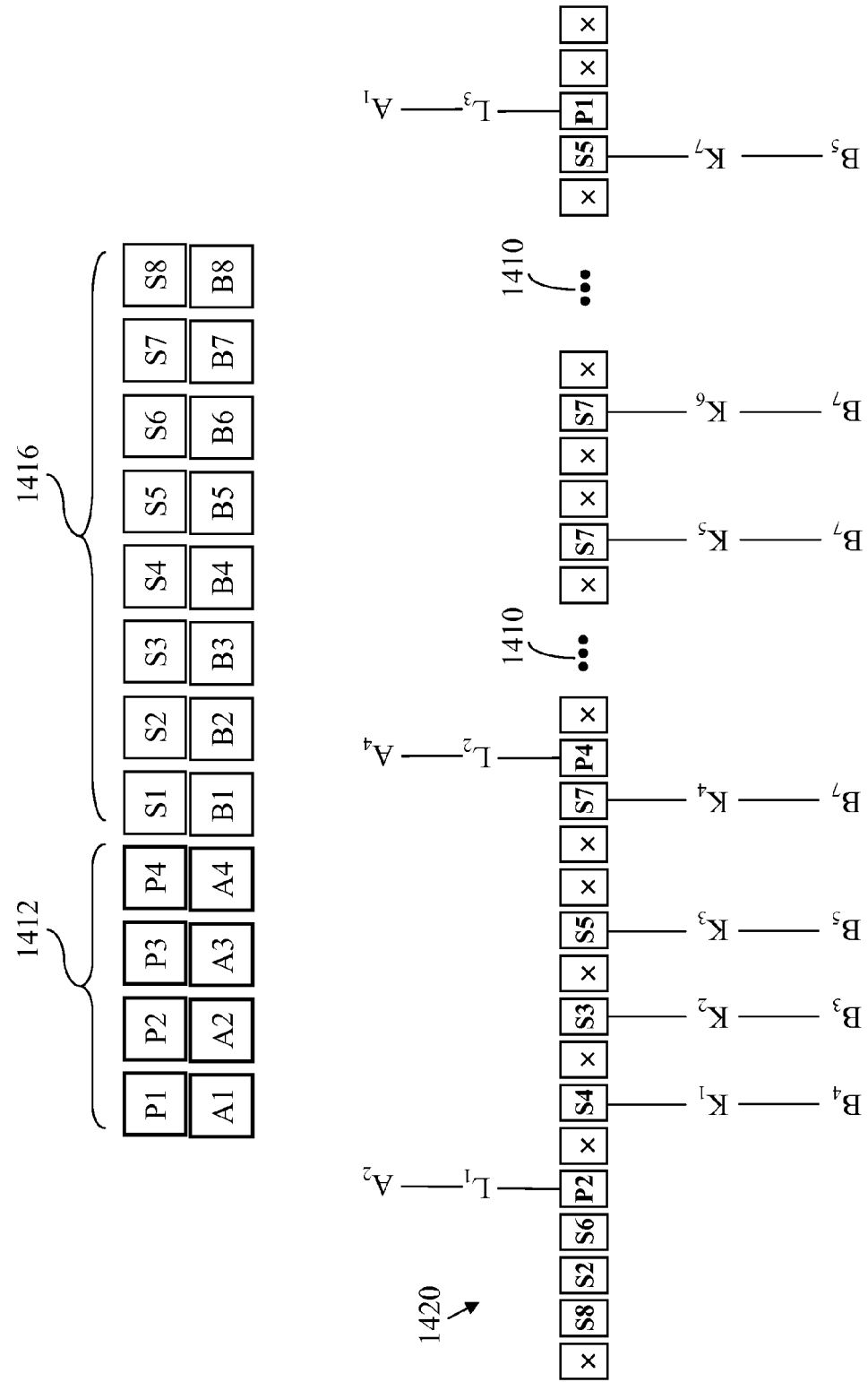
FIG. 14 illustrates string search in an exemplary text comprising string patterns belonging to two string sets, in accordance with an embodiment of the present invention.

FIG. 14 illustrates a first string set 1412 comprising "primary" string patterns labeled as P1, P2, P3, and P4, and a second string set 1416, comprising "secondary" string patterns labeled as S1, S2, S3, S4, S5, S6, S7, and S8. Each string pattern is assigned a corresponding text action. The text actions A1, A2, A3, and A4 correspond to string patterns P1, P2, P3, and P4, respectively, and text actions B1 to B8 correspond to string patterns S1 to S8, respectively. A text of characters 1420 comprises string patterns belonging to the string sets 1412 and 1416, as well as strings marked 'x' which are not of interest to the search process. Several segments 1410 of the text 1420 may not contain string patterns in either of string sets 1412 or 1416.

Text 1420 contains primary string patterns P2, P4, and P1, starting (or ending) at locations L1, L2, and L3 of the text, and ten secondary string patterns. The relevance, or otherwise, of any of the secondary string patterns is determined according to search parameters associated with the second string set 1416.

Although specific embodiments of the invention have been described in detail, it should be understood that the described embodiments are intended to be illustrative and not restrictive. Various changes and modifications of the embodiments shown in the drawings and described in the specification may be made within the scope of the following claims without departing from the scope of the invention in its broader aspect.

What is claimed is:

1. A method of string search in a character stream, the method comprising:
grouping string patterns of a dictionary into a plurality of string sets according to predetermined criteria;
defining a set of parameterized search states each search state characterized by:
domain parameters defining a search domain within said character stream;
a string set from among said plurality of string sets; and
a search rule;
associating with each string pattern of each string set a search action identifying a search domain and a subsequent search state;
acquiring an input text from said character stream;
selecting a current search state and setting a current search domain to cover the entire input text;
determining a current string set and a current rule corresponding to said current search state;
executing a search procedure using said current rule to determine a location of a current string pattern belonging to said current string set within said current search domain; and
ascertaining a subsequent search state and corresponding domain parameters.

2. The method of claim 1 further comprising:
setting said subsequent search state as said current search state;
delimiting said current search domain according to said corresponding domain parameters; and
repeating the steps of determining and executing.

3. The method of claim 1 wherein said each search state is further characterized by a search data structure.

4. The method of claim 1 further comprising a step of encoding said search rule as a set of data-driven instructions.

5. The method of claim 1 wherein said predetermined criteria are set by an administrator.

6. The method of claim 1 wherein said predetermined criteria are determined according to topological sorting of string patterns of said dictionary.

7. The method of claim 1 wherein said dictionary includes at least one complex string.

8. The method of claim 1 wherein said plurality of string sets comprises non-intersecting string sets.

9. The method of claim 1 wherein said plurality of string sets comprise a first group of non-intersecting string sets and at least one string set comprising at least two string sets of said first group of non-intersecting string sets.

10. The method of claim 1 further comprising:
associating with each string pattern of each string set a text action, from among a set of predefined text actions; and
performing a text action associated with said current string pattern.

11. The method of claim 10 wherein said text action is one of marking, altering, substituting, and deletion of said current string pattern.

12. A method of string search in a character stream, the method comprising:
constructing a dictionary of string patterns, associating a text action, from among a set of text actions, with each string pattern;
grouping said string patterns into a predefined number of ordered string sets according to predetermined criteria;
acquiring an input text from said character stream;
selecting a first string set as a current string set and a current search domain as the entire input text;
executing a search procedure to determine locations of current string patterns belonging to said current string set within said current search domain;
determining current text actions corresponding to said current string pattern;
cumulatively storing said locations and said current text actions;
selecting a subsequent string set according to a predetermined order of said string sets;
defining a current search domain according to said locations;
repeating said executing, determining, and storing for remaining string sets in said predefined number of ordered string sets; and
returning to the step of acquiring.

13. The method of claim 12 wherein the step of defining comprises setting said current search domain as a portion of said input text between two consecutive locations of said locations of current string patterns.

14. The method of claim 12 wherein the step of defining comprises setting said current search domain as a portion of said input text within a predefined number of characters following one of said locations of current string patterns.

15. A system for string search in a character stream, the system comprising:
a dictionary processor for grouping string patterns of a dictionary into a plurality of string sets and associating with each string pattern of each string set post-detection information comprising:
a text action, selected from a predefined set of text actions, to be applied to said character stream;
a subsequent string set; and
domain parameters defining a search domain within said character stream;
a conditional search engine for locating current string patterns belonging to a current string set within a current search domain in said character stream;
a search operator for setting a subsequent string set and corresponding search domain according to said current string patterns; and
a text operator for performing text actions corresponding to said current string patterns.

16. The system of claim 15 wherein said dictionary processor further assigns to each string set a search rule encoded as a set of data-driven instructions.

17. The system of claim 15 wherein said dictionary processor further assigns to each string set a respective search data structure.

18. The system of claim 15 further comprising buffers for storing input texts extracted from said character stream.

19. The system of claim 15 further comprising encoded search instructions based on a set of predefined search states where each string set in said plurality of string sets is associated with a search state.

20. The system of claim 15 further comprising a memory device storing a search-state-transition matrix each entry of which comprises encoded search instructions to be followed upon transition from one search state to another.

* * * * *